(12) United States Patent
Liu

(10) Patent No.: US 7,425,365 B2
(45) Date of Patent: Sep. 16, 2008

(54) OPTICAL FILM AND FABRICATION METHOD THEREOF

(75) Inventor: Po-Tau Liu, Taipei (TW)

(73) Assignee: Daxon Technology Inc., Taoyuan (TW)

( * ) Notice: Subject to any disclaimer, the term of this patent is extended or adjusted under 35 U.S.C. 154(b) by 223 days.

(21) Appl. No.: 11/388,271

(22) Filed: Mar. 24, 2006

(65) Prior Publication Data

US 2007/0110995 A1  May 17, 2007

(30) Foreign Application Priority Data

Nov. 16, 2005  (TW) .............................. 94140235 A

(51) Int. Cl.
*B32B 5/16* (2006.01)
*B32B 27/36* (2006.01)
*B32B 27/06* (2006.01)
*B32B 27/00* (2006.01)

(52) U.S. Cl. ....................... 428/323; 428/328; 428/329; 428/412; 428/426; 428/480; 428/500

(58) Field of Classification Search ....................... None
See application file for complete search history.

(56) References Cited

U.S. PATENT DOCUMENTS 4,869,948 A  *  9/1989  Iida et al. ..................... 428/216

* cited by examiner

*Primary Examiner*—Sheeba Ahmed
(74) *Attorney, Agent, or Firm*—Quintero Law Office

(57) ABSTRACT

An optical film and fabrication method thereof are disclosed. The optical film comprises a substrate and an anti-static layer disposed thereon. The anti-static layer comprises a resin layer and a plurality of anti-static particles, wherein the bottom half portion of the anti-static layer contains more than 60 wt % of the anti-static particles.

10 Claims, 3 Drawing Sheets

OPTICAL FILM AND FABRICATION METHOD THEREOF

BACKGROUND OF THE INVENTION

Field of the Invention

The invention relates to a thin film and fabrication method thereof, and in particular to an optical film and fabrication method thereof.

Liquid crystal display (LCD) and liquid crystal display television (LCD TV) are currently popular in display technology. An optical film having good transmittance is an important component. A hard coat layer is usually coated on an optical film, preventing outside damage. The hard coat layer is mostly insulation and comprises resin materials, such that static electricity is easily accumulated, producing electrostatic discharge (ESD), and dust is readily attracted to its surface. Therefore, an anti-static layer is usually coated on the hard coat layer surface to prevent the static issues.

A conventional anti-static hard coat layer can be formed by coating once or twice. Two-step coating is more problematic than one-step coating, since some defects appear as a bottom layer coated on a substrate, and other defects appear as a top layer then coated on the bottom layer, so that the defective fraction of two-step coating is higher.

Two-step coating involves two types, anti-static layer upon hard coat layer and hard coat layer upon anti-static layer.

FIG. 1a shows an anti-static hard coat film 10a, comprising substrate 12, hard coat layer 14 and anti-static layer 16 respectively disposed on the substrate 12, and anti-static particles 18 dispersed in the anti-static layer 16. In this case, electric conductivity is increased due to the anti-static layer 16 disposed as the surface layer of the anti-static hard coat film 10a, but anti-scratch properties are reduced because the hardness and abrasion of the anti-static layer 16 is usually poorer than that of the hard coat layer 14.

FIG. 1b shows an anti-static hard coat film 10b, comprising substrate 12, hard coat layer 14 and anti-static layer 16 respectively disposed on the substrate 12, and anti-static particles 18 dispersed in the anti-static layer 16. In this case, anti-scratch properties are increased due to the hard coat layer 14 disposed as the surface layer of the anti-static hard coat film 10b, but electric conductivity is reduced.

If the refractive index of the anti-static particles 18 is high, the anti-static layer 16 as shown in FIGS. 1a and 1b will results in interference and high reflection, especially the anti-static particles 18 are collected in a thin layer (the anti-static layer 16).

One-step coating can also be used. Referring to FIG. 1c, an anti-static hard coat film 10c is provided, comprising a substrate 12 and an anti-static layer 15 disposed thereon. The anti-static layer 15 comprises a resin layer 19 and dispersed anti-static particles 18. The process of one-step coating is simpler than two-step coating, but the anti-static effects of the anti-static hard coat film 10c are less than the anti-static hard coat film 10a and 10b due to more separated particles.

BRIEF SUMMARY OF THE INVENTION

A detailed description is given in the following embodiments with reference to the accompanying drawings.

In an embodiment, an optical film is provided. The optical film comprises a substrate and an anti-static layer disposed thereon. The anti-static layer comprises a resin layer and a plurality of anti-static particles, wherein the bottom half portion of the anti-static layer contains more than 60 wt % of the anti-static particles.

A method for fabricating an optical film is also provided. A substrate is provided. An anti-static solution is coated on the substrate to form an anti-static wet layer thereon. The anti-static solution comprises a plurality of anti-static particles and a resin material. The anti-static particles are interacted by an external force or an inter-particle force. The anti-static wet layer is dried and cured to form an anti-static layer, which comprises the anti-static particles and a resin layer. The anti-static layer has a top half portion and a bottom half portion containing more than 60 wt % of the anti-static particles.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

An optical film and fabrication method thereof are provided, with, when a bottom half portion of an anti-static layer contains more than 60 wt % of anti-static particles, properties including anti-scratch, anti-static, low reflection or low interference.

Figure 2A:
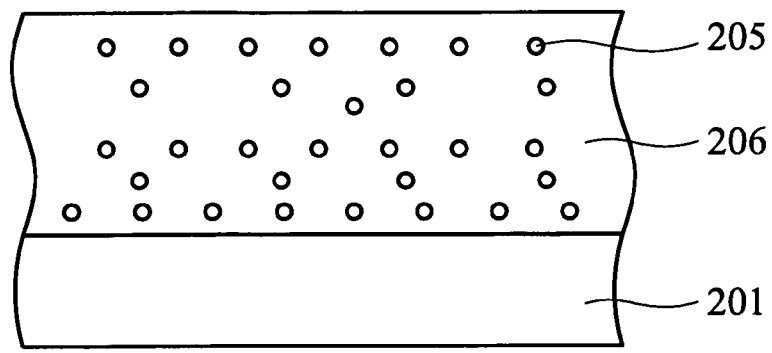
FIG. 2a is a cross section of an anti-static solution coated on a substrate in an embodiment of the invention.

FIG. 2a shows anti-static wet layer 206 being coated on a substrate 201 in an embodiment of the invention. The anti-static wet layer 206 comprises solvent and anti-static particles 205 dispersed therein.

Figure 2B:
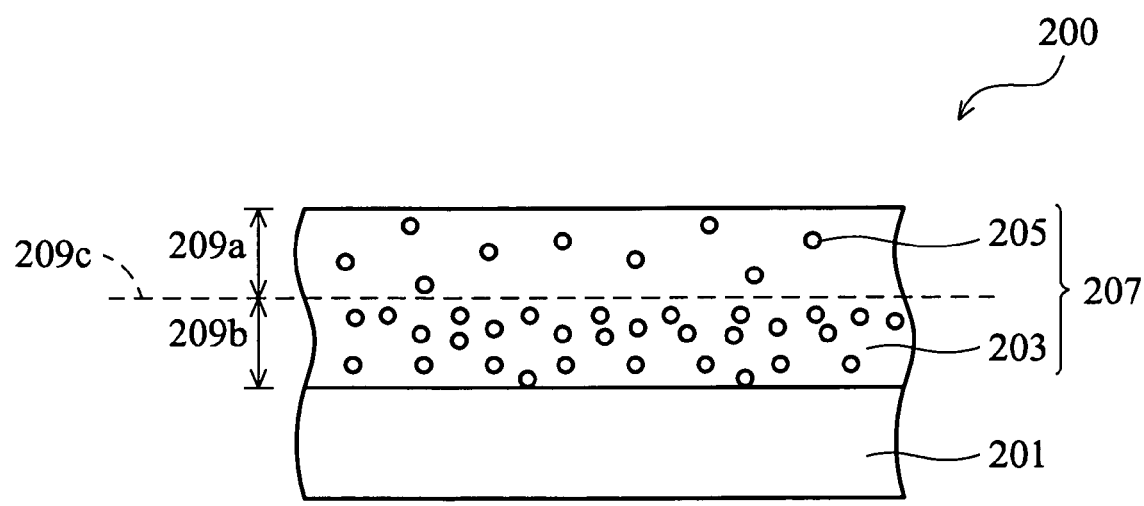
FIG. 2b is a cross section of an optical film in an embodiment of the invention.

FIG. 2b is a cross-section of an optical film 200 in an embodiment of the invention. The optical film 200 comprises a substrate 201 and an anti-static layer 207 disposed thereon. The anti-static layer 207 comprises a resin layer 203 and anti-static particles 205. A virtual plane 209c, parallel to the substrate 201, is in the position of half thickness of the anti-static layer 207. The portions of anti-static layer 207 above and below the virtual plane 209c are respectively referred to as top half portion 209a and bottom half portion 209b. In an embodiment of the invention, the bottom half portion 209b contains more than 60 wt % of the anti-static particles 205, and in another, between about 60 and 90 wt %, and yet another, between about 70 and 90 wt %.

The anti-static wet layer 206 as shown in FIG. 2a is a wet layer (having solvent), after the process described the following, the anti-static wet layer 206 is dryer and the structure of the anti-static layer 207 as shown in FIG. 2b is formed.

Figure 2C:
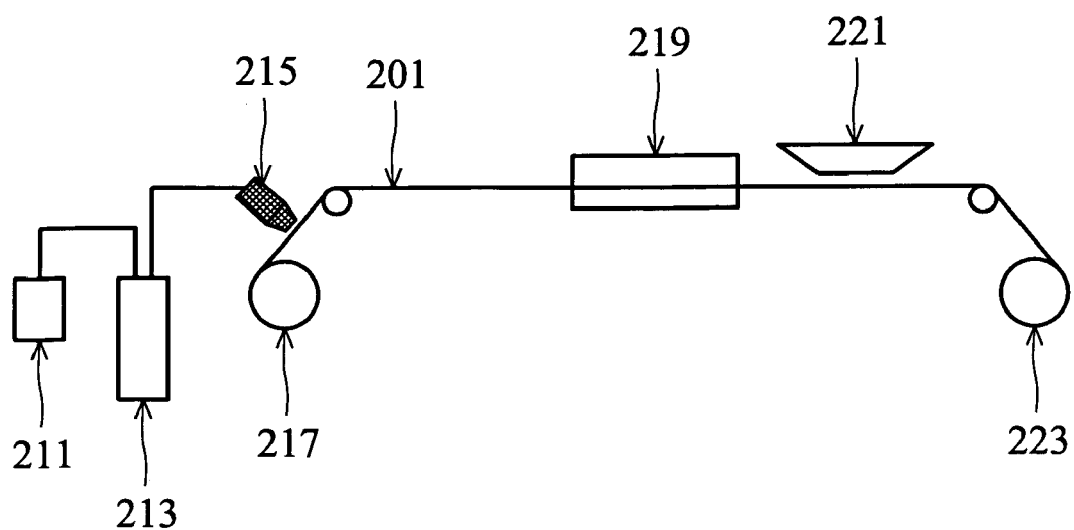
FIGS. 2c to 2d are devices for fabricating an optical film according to the invention.

Referring to FIG. 2c, electrolyte in tank 211 is added into anti-static solution placed in tank 213, and the solution is mixed well by stirring. Added amount of electrolyte depends on its charge. Substrate 201 is transported by unwinder 217 and winder 223, anti-static solution is supplied to the surface of the substrate 201 through coater head 215, and then a structure as shown in FIG. 2a is formed.

After that, the coated substrate is transported by the unwinder 217 and winder 223 to the oven 219 and the following curing device 221, so that solvent is evaporated, resin is hardened, such that the anti-static wet layer 206 (as shown in FIG. 2a) is converted into anti-static layer 207(as shown in FIG. 2b), and then the optical film 200 as shown in FIG. 2b is formed.

An acceptable added amount of electrolyte depends on its charge, too high or too low electrolyte concentration is not applicable in the invention. For example, concentration of monovalent electrolyte in anti-static solution is between about $10^{-6}$ to $10^{-1}$ M. Aggregation of particles are not obvious when electrolyte concentration is too low, normally lower than $10^{-6}$ M. Larger than 1 um particles are dramatically formed such that transmittance of the film is negatively affected when electrolyte concentration is too high, normally higher than $10^{-1}$ M.

In an embodiment of the invention, electrolyte can be of acid electrolyte, alkali electrolyte, salts, or other ionic compound, such as NaCl, KCl, $KNO_3$, $Na_2CO_3$, $Mg(NO_3)_2$, $K_2SO_4$, $H_2CO_3$, $CH_3COOH$, or $KAl(SO_4)_2$. By addition of electrolyte, anti-static particles become unstable, so that collision probability between particles is increased and sedimentation of the aggregated particles becomes easier.

Electrolyte is used in an embodiment of the invention causing aggregations, while polymeric flocculant(also referred to as polymeric flocculating agent) can also be used. The polymeric flocculant can be inorganic polymeric flocculant such as poly aluminum chloride, or organic polymeric flocculant such as polyacrylamide. While utilizing polymeric flocculent, anti-static particles are bridged by polymer chains, resulting aggregations.

A stirring apparatus can optionally be used in the tank 213 as shown in FIG. 2c, so that electrolyte (or polymeric flocculent) is dissolved (or dispersed) well, and sedimentation of anti-static particles in the tank 213 can be prevented.

Figure 2D:
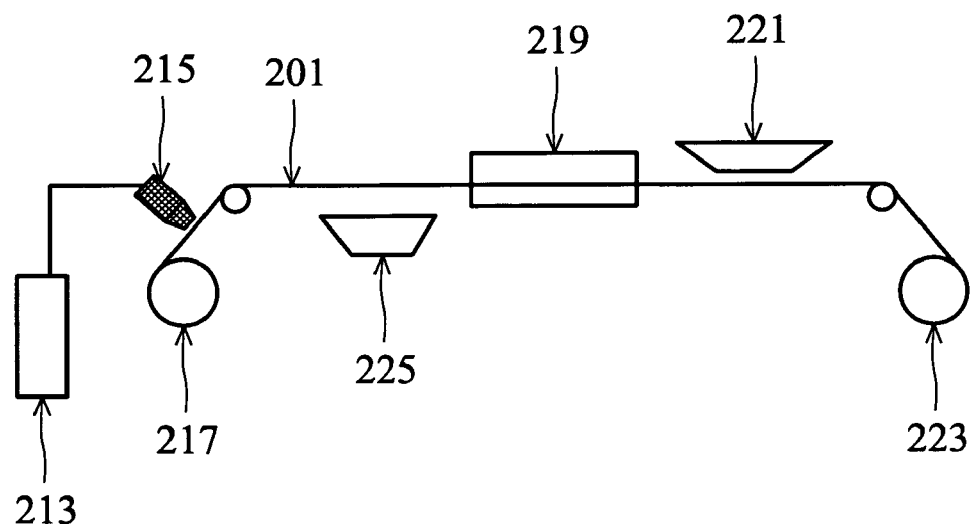

Referring to FIG. 2b, the resin layer 203 can be of ultraviolet-cured resin, thermal-cured resin, or electron-beam-cured resin, so that the curing device 221 as shown in FIGS. 2c and 2d can be an ultraviolet curing device, a thermal curing device, or a electron beam curing device.

Referring to FIG. 2c, the coating method for coating a solution on the substrate 201 by coater head 215 can be slot die coating, extrusion coating, gravure coating, co-extrusion coating, slide coating, or curtain coating.

FIG. 2d shows another device for fabricating an optical layer in another embodiment of the invention, wherein, as shown, substrate 201 is transported by the unwinder 217 and winder 223, anti-static solution placed in tank 213 is supplied to the substrate 201 through coating die 215, and then a structure as shown in FIG. 2a is formed.

After that, the coated substrate is transported by the unwnder 217 and winder 223 to an electric field generator 225, the anti-static particles 205 in anti-static wet layer 206 as shown in FIG. 2a are attracted and move to the substrate direction by electric force (referred to as electrophoresis) due to the charged particles, and then the coated substrate is transported to the oven 219 and the curing device 221, so that solvent is evaporated, resin is hardened, such that the anti-static wet layer 206 (as shown in FIG. 2a) is converted to the anti-static layer 207(as shown in FIG. 2b), and then the optical film 200 as shown in FIG. 2b is formed.

An magnetic field generator (not shown) can also be used to replace the electric field generator 225 to attract and aggregate particles if the particles may also be ferromagnetic.

Referring to FIG. 2a, the anti-static wet layer 206 is coated from a solution containing photo initiators and at least one of monomers and oligomers dissolved in a solvent.

Photo initiators can be of benzophenone, 1-hydroxy-cyclo-hexyl-phenyl-ketone, 2-hydroxy-2-methyl-1-phenyl-1-propanone, or methylbenzoylformate.

Monomers can be of isobutyl acrylate, 2-ethylhexyl acrylate, 1,6-hexanediol diacrylate, tripropylene glycol diacrylate, trimethylolpropane diacrylate, dipentaerythritol pentaacrylate, pentaerythritol triacrylate, or dipentaerythritol hexaacrylate.

Oligomers can be of urethane (meth)acrylate oligomer, polyester (meth)acrylate oligomer, or epoxy (meth)acrylate oligomer.

Solvents can be of Isopropanol(IPA), methyl ethyl ketone (MEK), methyl isobutyl ketone(MIBK), ethyl acetate(EAC), butyl acetate(BAC), toluene, cyclohexanone, methanol, or propylene glycol monoethyl esther.

Inorganic nanoparticles can be added to the anti-static wet layer 206 as shown in FIG. 2a to reduce the curl level of the anti-static layer 207 as shown in FIG. 2b due to volume contraction during drying. Inorganic nanoparticles can be of silica, alumina, zirconia, titania, zinc oxide, germanium oxide, indium oxide, or tin oxide.

The anti-static particles 205 as shown in FIG. 2a and 2b can be of antimony-doped tin oxide, tin oxide, zinc antimonite, antimony pentoxide, indium tin oxide, or aluminum-doped zinc oxide. The radius of the anti-static particles 205 is between about 5 and 100 nm, preferably between about 10 and 40 nm.

As shown in FIG. 2a, the zeta potential of the anti-static particles 205 in the anti-static wet layer 206 is between about +70 and −70 eV, preferably between about −10 and −50 eV. The anti-static particles 205 can stably suspend in the anti-static solution before adding electrolyte or polymeric flocculant, such that the anti-static solution is suitable for storage.

As shown in FIG. 2b, the anti-static particles 205 are 20 to 80 wt % of the anti-static layer 207, preferably 30 to 70 wt %. Anti-static layer 207 comprises resin layer 203 and anti-static particles 205.

Substrate 201 can be of glass, poly(meth)acrylate, polycarbonate, polyethylene(PE), polyethylene terephthalate(PET), or triacetyl cellulose(TAC).

The invention will be better understood by reference to Tables 1 and 3 showing compositions of each comparison and embodiment, and Tables 2 and 4 showing their experimental results.

TABLE 1

| Name | composition | comparison 1 | embodiment 1 |
|---|---|---|---|
| photo initiator | Irgacure 184(Ciba-Geigy) | 3 g | 3g g |
| monomer | pentaerythritol triacrylate | 100 g | 100 g |
| anti-static particles | CX-Z210IP(Nissan chemical) | 200 g | 200 g |
| solvent | methyl ethyl ketone(MEK) | 100 g | 100 g |
| electrolyte | sodium chloride | 0 M | 0.001 M |

The solutions of comparison 1 and embodiment 1 were respectively coated on 80 um thick triacetyl cellulose (TAC, Fuji corporation) films by RDS no. 5 coating rod, placed in an oven at 70° C. for 3 minutes, radiated by H-type mercury lamp(300 mJ/cm² dose), and anti-static hard coat films were respectively formed. After that, anti-scratch properties of the two anti-static hard coat films were tested 10 times by steel wire rope (no. 0000), transmittance was measured by transmittance measuring instrument (type: NDH2000, NIPPON DESHOKU corporation), and surface resistance was measured at 100V by surface resistance measuring instrument (type: model 65, Keithley corporation). The experimental results are shown in Table 2.

TABLE 2

| experimental result | comparison 1 | embodiment 1 |
|---|---|---|
| transmittance | 89.04% | 88.74% |
| surface resistance | $2.3 * 10^9$ $\Omega/cm^2$ | $2.5 * 10^9$ $\Omega/cm^2$ |
| anti-scratch property | with scratch under 200 g/cm² pressure | without scratch under 300 g/cm² pressure |

As shown in Table 2, the anti-static hard coat film of embodiment 1 was not scratched due to sedimentation of anti-static particles result from addition of electrolyte.

TABLE 3

| name | composition | comparison 2 | embodiment 2 |
|---|---|---|---|
| photo initiator | Irgacure 184(Cita-Geigy) | 3 g | 3 g |
| monomer | dipentaerythritol hexaacrylate | 50 g | 50 g |
| oligomer | CN7295(Sartomer) | 50 g | 50 g |
| anti-static particles | CX-Z210IP(Nissan chemical) | 200 g | 200 g |
| solvent 1 | methyl ethyl ketone(MEK) | 50 g | 50 g |
| solvent 2 | Isopropanol(IPA) | 50 g | 50 g |
| electrolyte | sodium chloride | 0 M | 0.1 M |

The solutions of comparison 2 and embodiment 2 were respectively coated on 80 um thick triacetyl cellulose (TAC, Fuji corporation) films by RDS no. 5 coating rod, placed in an oven at 70° C. for 3 minutes, radiated by H-type mercury lamp(300 mJ/cm² dose), and then anti-static hard coat films were respectively formed. After that, anti-scratch properties of the two anti-static hard coat films were tested 10 times by steel wire rope (no. 0000), transmittance was measured by transmittance measuring instrument (type: NDH2000, NIPPON DESHOKU corporation), and surface resistance was measured at 100V by surface resistance measuring instrument (type: model 65, Keithley corporation). The experimental results were shown in Table 4.

TABLE 4

| experimental result | comparison 2 | embodiment 2 |
|---|---|---|
| transmittance | 89.08% | 88.01% |
| surface resistance | $1.7 * 10^{11}$ $\Omega/cm^2$ | $1.2 * 10^9$ $\Omega/cm^2$ |
| anti-scratch property | without scratch under 300 g/cm² pressure | without scratch under 300 g/cm² pressure |

As shown in table 4, the surface resistance was reduced due to aggregation of anti-static particles result from addition of electrolyte.

As shown in above experimental result, an optical film according to the invention provides anti-static property and/or anti-scratch property. Its mechanism is described below.

Referring to FIGS. 2a and 2b, anti-scratch ability is usually reduced when anti-static particles 205 exist near the surface of the anti-static layer 207, because the particles 205 and the resin layer 203 are bonded together by weaker physical bonds such as van der Waals force. Therefore, the anti-scratch ability of the anti-static layer 207 is increased while anti-static particles 205 deposited at the bottom, remaining more chemical-bonded resin material on the surface of the anti-static layer 207.

Since collision probability between particles as shown in FIG. 2a is increased resulting from compressed electric double layer (not shown) of anti-static particles 205 by addition of electrolyte or polymeric flocculent, the number of particles dispersed in bottom half portion 209b are more than that in top half portion 209a. Therefore, the anti-static particles 205 are more concentrated and surface resistance thereof is reduced.

The formation of the conductive regions is affected by dispersed particle concentration, zeta potential of the anti-static particles, particle size, and electrolyte concentration. The primary particle size of anti-static particles 205 is between about 5 and 100 nm, preferably 10 and 40 nm. The anti-static particles 205 are 20 to 80 wt % of the anti-static layer 207, preferably 30 to 70 wt %. Zeta potential of the anti-static particles 205 are between +70 and −70 eV, preferably −10 and −50 eV. Added amount of electrolyte depends on its charge, for example, the concentration needed for univalent electrolyte is between about $10^{-6}$ and $10^{-1}$ M.

In another embodiment of the invention, electric field or magnetic field is applied, such that conductive regions are also formed inside the anti-static layer 207. The surface resistance of the anti-static layer 207 thereof is reduced because the number of particles dispersed in bottom half portion 209b are more than that in top half portion 209a. This is because collision probability between particles as shown in FIG. 2a increases resulting from anti-static particles 205 inside anti-static wet layer 206 are attracted and move to bottom portion thereof.

Figure 1A:
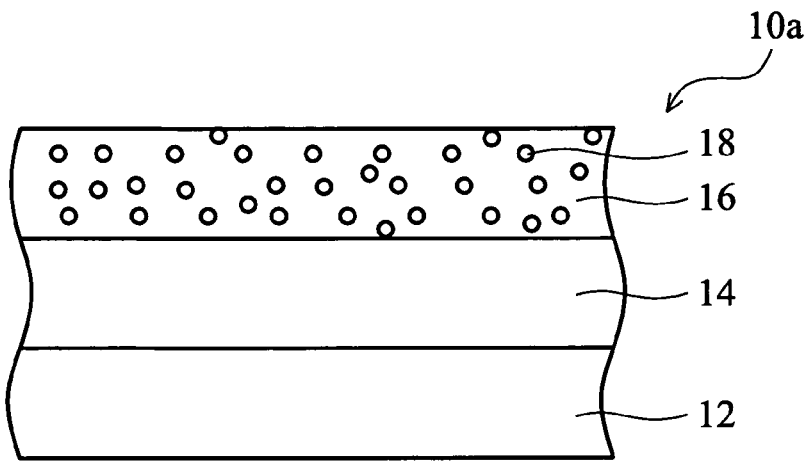
FIGS. 1a to 1c are cross-sections of conventional anti-static hard coat films.
Figure 1B:
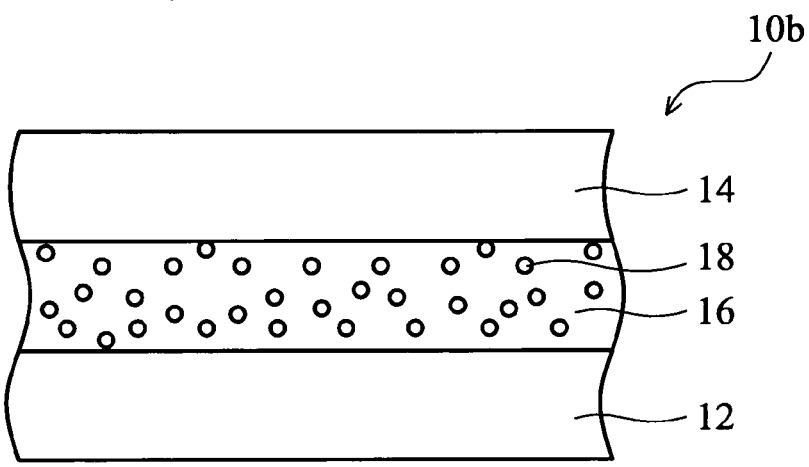
Figure 1C:
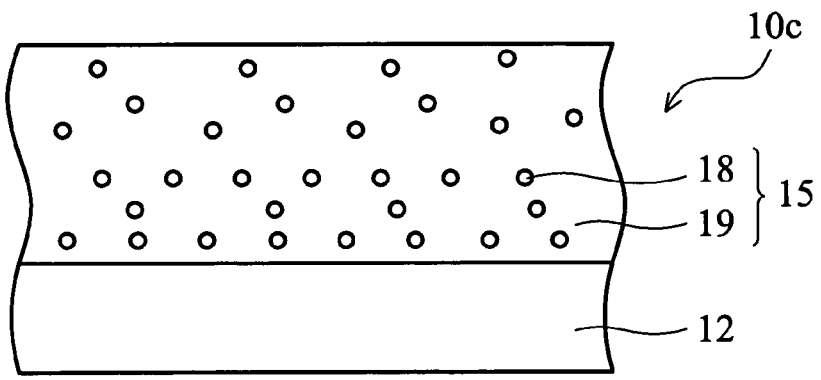

Referring to FIG. 2b, although more anti-static particles 205 are dispersed in the bottom half portion 209b than top half portion 209a, anti-static 205 particles are not all dispersed in a very narrow area (unlike structures as shown in FIGS. 1a and 1b). Therefore, interference and reflection of the anti-static layer 207 are lower.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical film, comprising:
    a substrate; and
    an anti-static layer disposed on the substrate, wherein the anti-static layer comprises a resin layer with a plurality of anti-static particles dispersed therein, and the anti-static layer has a top half portion and a bottom half portion closer to the substrate than the top half portion,
    wherein the bottom half portion has higher anti-static particle concentration than the top half portion, and the bottom half portion contains more than 60 wt% of the anti-static particles.

2. The optical film of claim 1, wherein the bottom half portion of the anti-static layer contains 60 to 90 wt% of the anti-static particles.

3. The optical film of claim 1, wherein the bottom half portion of the anti-static layer contains 70 to 90 wt% of the anti-static particles.

4. The optical film of claim 1, wherein the substrate comprises glass, polymethacrylate, polycarbonate, polyethylene (PE), polyethylene terephthalate(PET), or triacetyl cellulose (TAC).

5. The optical layer of claim 1, wherein the anti-static particles comprise antimony-doped tin oxide, tin oxide, zinc antimonite, antimony pentoxide, indium tin oxide, or aluminum-doped zinc oxide.

6. The optical layer of claim 1, wherein the resin layer comprises ultraviolet-cured resin, thermal-cured resin, or electron-beam-cured resin.

7. The optical film of claim 1, wherein the anti-static particles have a primary diameter of 5 to 100 nm.

8. The optical film of claim 1, wherein the anti-static particles have a primary diameter of 10 to 40 nm.

9. The optical film of claim 1, wherein the anti-static particles are 20 to 80 wt% of the anti-static layer.

10. The optical film of claim 1, wherein the anti-static particles are 30 to 70 wt% of the anti-static layer.

* * * * *